United States Patent
Lee

(12) 
(10) Patent No.: US 6,396,684 B2
(45) Date of Patent: *May 28, 2002

(54) STRUCTURE OF TOWER-TYPE PERSONAL COMPUTER

(75) Inventor: Hyun Ho Lee, Sungnam (KR)

(73) Assignee: LG Electronics Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/281,827

(22) Filed: Apr. 5, 1999

(30) Foreign Application Priority Data

Apr. 10, 1998 (KR) ......................... 1998-12799

(51) Int. Cl.[7] .............................. H05K 5/02; H05K 5/03; H05K 7/20
(52) U.S. Cl. ....................... 361/683; 361/694; 361/695; 361/724; 312/208.3; 312/208.1; 312/223.2
(58) Field of Search ................................. 361/679, 683, 361/695, 730, 687, 690, 724, 725, 694; D13/162, 184; 312/208.1–208.4, 294, 301, 223.1, 223.2

(56) References Cited

U.S. PATENT DOCUMENTS

| | | | | |
|---|---|---|---|---|
| 5,432,674 A | * | 7/1995 | Hardt | 361/694 |
| D363,479 S | * | 10/1995 | Tinsley, Jr. et al. | D14/115 |
| D363,707 S | * | 10/1995 | Crane, Jr. et al. | D14/102 |
| D369,923 S | * | 5/1996 | Crane, Jr. et al. | D6/441 |
| 5,527,104 A | * | 6/1996 | Moss | 312/264 |
| 5,547,272 A | * | 8/1996 | Paterson et al. | 312/223.2 |
| D382,255 S | * | 8/1997 | Moffatt | D14/107 |
| 5,917,696 A | * | 6/1999 | Peng | 361/686 |

* cited by examiner

*Primary Examiner*—Leo P. Picard
*Assistant Examiner*—Anatoly Vortman
(74) *Attorney, Agent, or Firm*—Birch, Stewart, Kolasch & Birch, LLP

(57) ABSTRACT

A structure of a tower-type personal computer which minimizes its main body in size, improves an aesthetic property, and efficiently performs a heat cooling process, includes: a frame having its rear portion provided with a rear panel having connectors for connection with peripheral devices, its front lower portion provided with a device drive module installing space so that a disk and the like are inserted thereinto, its front upper portion formed in a round shape curved toward a rear direction, and its one side formed for computer components to be installed; a front panel provided at the front portion of the frame, having its lower portion formed for device drive modules to be installed, and having its upper portion formed in a round shape curved toward a rear direction identically to the upper portion of the frame; a bottom panel forming a bottom portion of the frame; a cover forming an outline by covering the frame; device drive modules installed at the lower portion of the front panel in the frame; a mother board installed at one side portion of the frame; a central processing unit installed at the upper portion of the mother board; a power supply installed at the rear panel on an identical horizontal line to the central processing unit; and option cards installed at the lower portion of the mother board.

6 Claims, 4 Drawing Sheets

STRUCTURE OF TOWER-TYPE PERSONAL COMPUTER

BACKGROUND OF THE INVENTION

1. Field of the Invention

The present invention relates to a tower-type personal computer, and in particular to a structure of a tower-type personal computer which minimizes its main body in size, improves an aesthetic property, and increases reliability of products by efficiently performing a cooling process on a heat generated from its main body.

2. Description of the Background Art

FIG. 1 is a structure view illustrating an inside structure of a general tower-type personal computer. As shown therein, the general tower-type personal computer that consists of a hexahedron, includes: a frame 20 having its rear portion provided with a rear panel 10 having a plurality of connectors (not shown) for connection with peripheral devices, and having its one side formed for components to be installed; a front panel 30 installed at a front portion of the frame 20 so that disc and the like are inserted thereinto; a bottom panel 40 forming a bottom portion of the frame 20; and a cover 50 covering the frame 20 and forming an outline.

On the other hand, a system for driving the computer is provided in the frame 20. At the upper portion of the front panel 30 are installed device driver modules 60, such as an FDD module 61, an HDD module 62 and a CD-ROM module 63. At the lower portion thereof are provided a power switch, a reset switch and an indicator. A mother board 64 where various interface circuit boards are installed is provided at one side portion of the frame 20 for sharing a signal cable and a power wire.

Further, a central processing unit (CPU) 65 controlling an operation of the system is provided at an upper portion of the mother board 64. A plurality of option cards 66 improving system performance are positioned at a lower portion of the mother board 64. A power supply 67 supplying a power to the system is provided at an upper portion of the rear panel 10.

Here, a fan 67a is installed at the power supply 67 toward a hole 10a of the rear panel 10, thereby externally discharging a heat generated from the power supply 67. A fan 65a is also provided at the CPU 65, and thus serves to cool a heat generated therefrom.

FIGS. 2 and 3 are side views respectively illustrating installing positions of components in accordance with the conventional technique.

Referring to FIG. 2, a module installing space (A) is provided at a front upper portion in the frame 20 for installing the device drive module 60, such as the FDD module 61, the HDD module 62 and the CD-ROM module 63. A spare space (B) is provided at a lower portion thereof for obtaining an installing space for other components.

In addition, a space for installing the power supply 67 and the CPU 65 is provided at an upper portion in the frame 20, and a space for installing the plurality of option cards 66 is provided at a lower portion thereof.

As a modified embodiment of the constitution in FIG. 2, as illustrated in FIG. 3, the positions of the module installing space (A) and the spare space (B) are exchangeable. Accordingly, the positions of the space for installing the power supply 67 and the CPU 65 and the space for installing the option cards 66 are exchanged.

As described above, in the general tower-type personal computer, a great deal of heat is generated from the CPU 65 and power supply 67 in operation, and as a result a temperature inside the system is increased. Accordingly, the personal computer must have a structure for minimizing an influence from the heat, when installing each component. Spaces must be efficiently utilized when arranging the components.

However, in the conventional personal computer shape and system installing structure, only the heat generated from the power supply can be externally discharged. Accordingly, the heat generated from the CPU and components are transmitted to the module installing space, thus influencing on the device drive modules. As a result, a mis-operation of the system takes place, and a lifespan thereof is decreased.

In addition, when the power supply is positioned at the lower portion of the personal computer, a heat generated from the power supply rises by a convection process. Accordingly, the components of the personal computer, such as the CPU are heated, and thus lifespan thereof is decreased.

In order to overcome the above-mentioned disadvantages, an special cooling fan is further provided at the CPU. However, it incurs more expenses and causes much noise.

In addition, it is difficult to minimize the computer in size and to improve an aesthetic property due to the spare space for installing other components.

SUMMARY OF THE INVENTION

It is therefore an object of the present invention to provide a structure of a tower-type personal computer which minimizes the computer in size and improves an aesthetic property by forming a front upper portion of a computer main body in a round shape with a first and second plurality of vent holes, and which increases cooling efficiency of a system.

In order to achieve the above-mentioned object of the present invention, there is provided a quarter-circle shaped structure of a tower-type personal computer including: a frame having its rear portion provided with a rear panel having a plurality of connectors for connection with peripheral devices, its front lower portion provided with a device drive module installing space so that a disk and the like are inserted thereinto, its front upper portion formed having the same curvature as a quarter-circle, and its one side formed in order for computer components to be installed; a front panel provided at the front portion of the frame, having its lower portion formed for device drive modules to be installed, and having its upper portion formed having the same curvature as a quarter-circle, a plurality of vent holes being formed at the round-shaped portion; a bottom panel forming El bottom portion of the frame; a cover, covering the frame; device drive modules installed at the lower portion of the front panel in the frame; a mother board installed at one side portion of the frame; a central processing unit installed at the upper portion of the mother board; a power supply installed at the rear panel on an identical horizontal line to the central processing unit; and a plurality of option cards installed at the lower portion of the mother board.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE INVENTION

A structure of a tower-type personal computer in accordance with the present invention will now be described with reference to the accompanying drawings.

Figure 1:
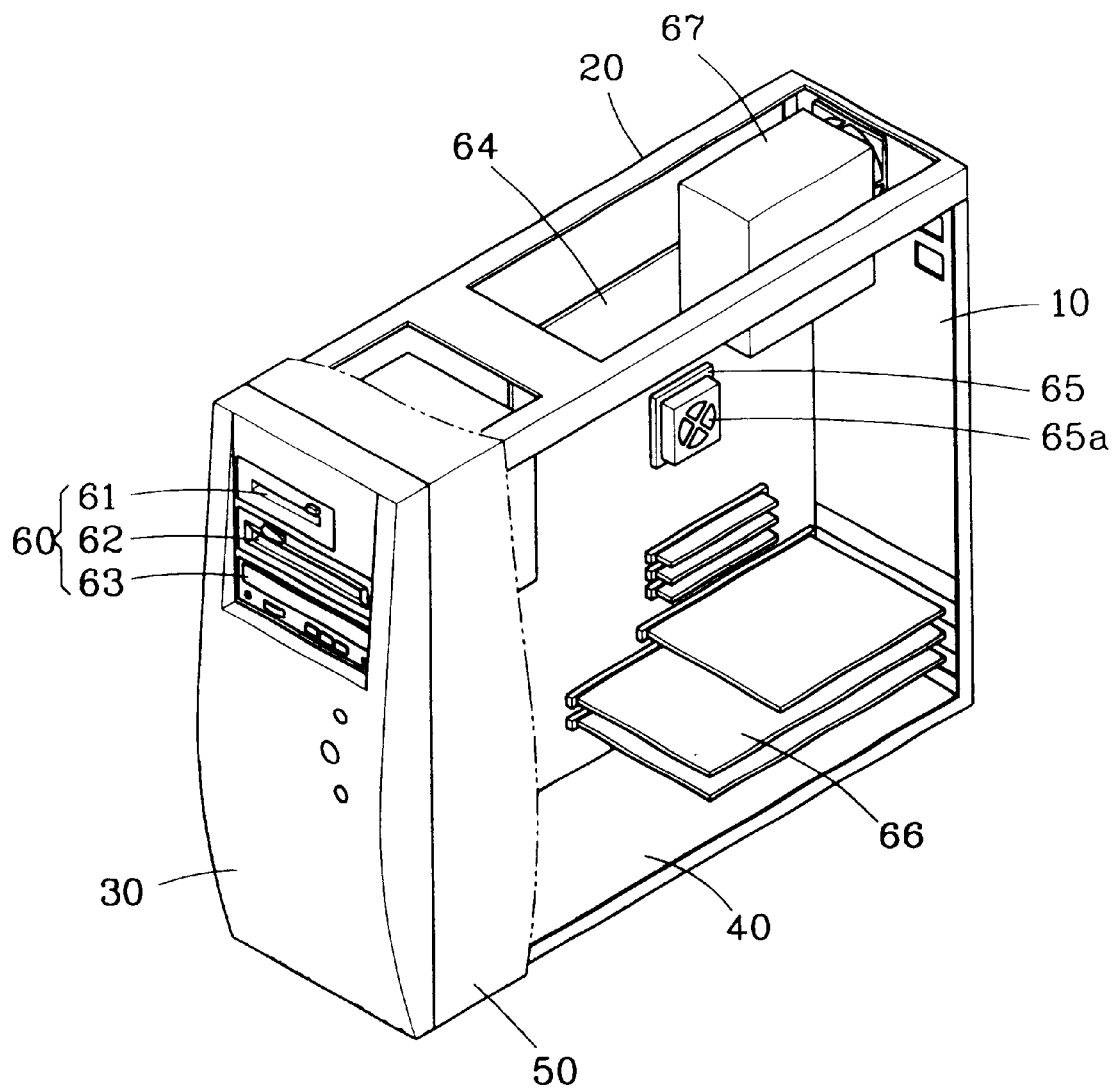
FIG. 1 is a structure view illustrating an inside structure of a conventional tower-type personal computer.
Figure 2:
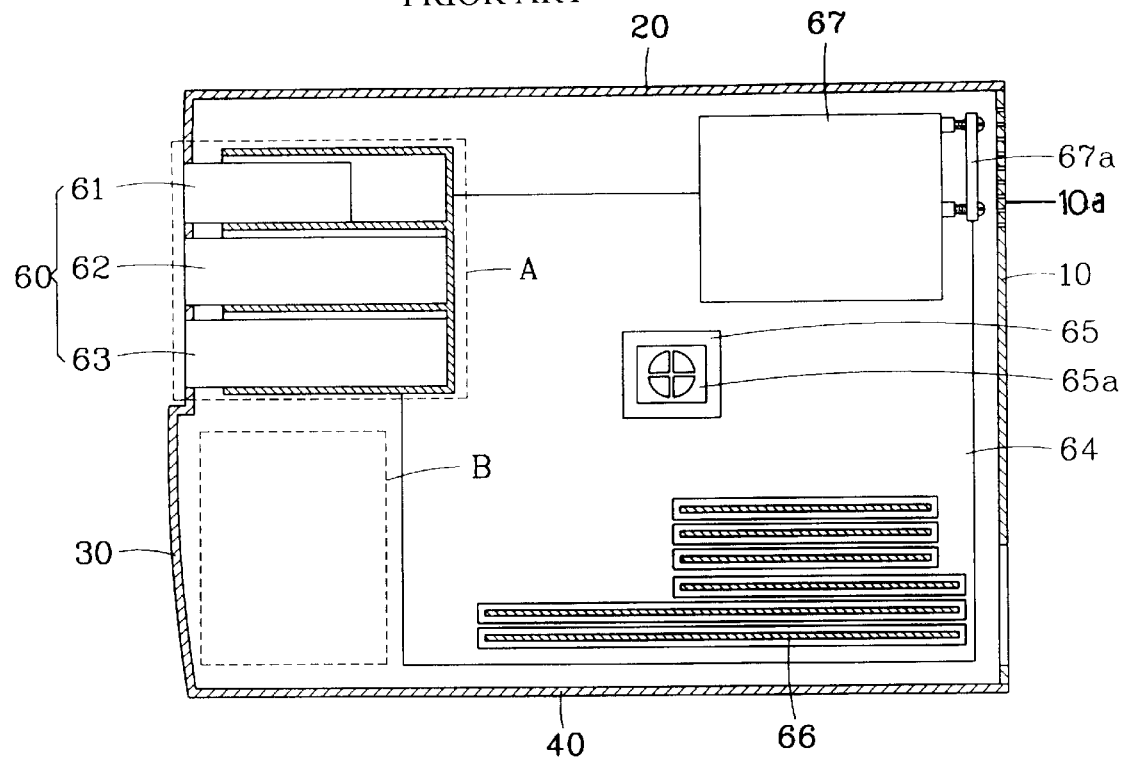
FIG. 2 is a side-sectional view illustrating a structure of the conventional tower-type personal computer.
Figure 3:
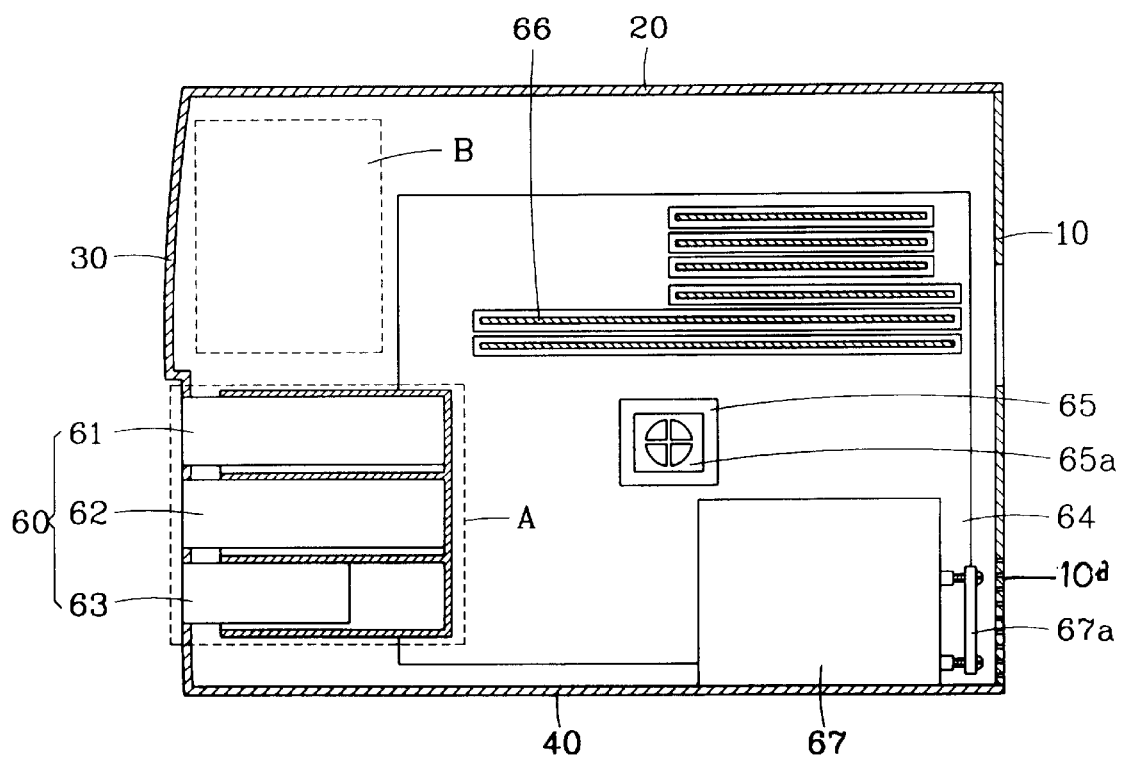
FIG. 3 is a side-sectional view illustrating a modified structure of the conventional tower-type personal computer.
Figure 4:
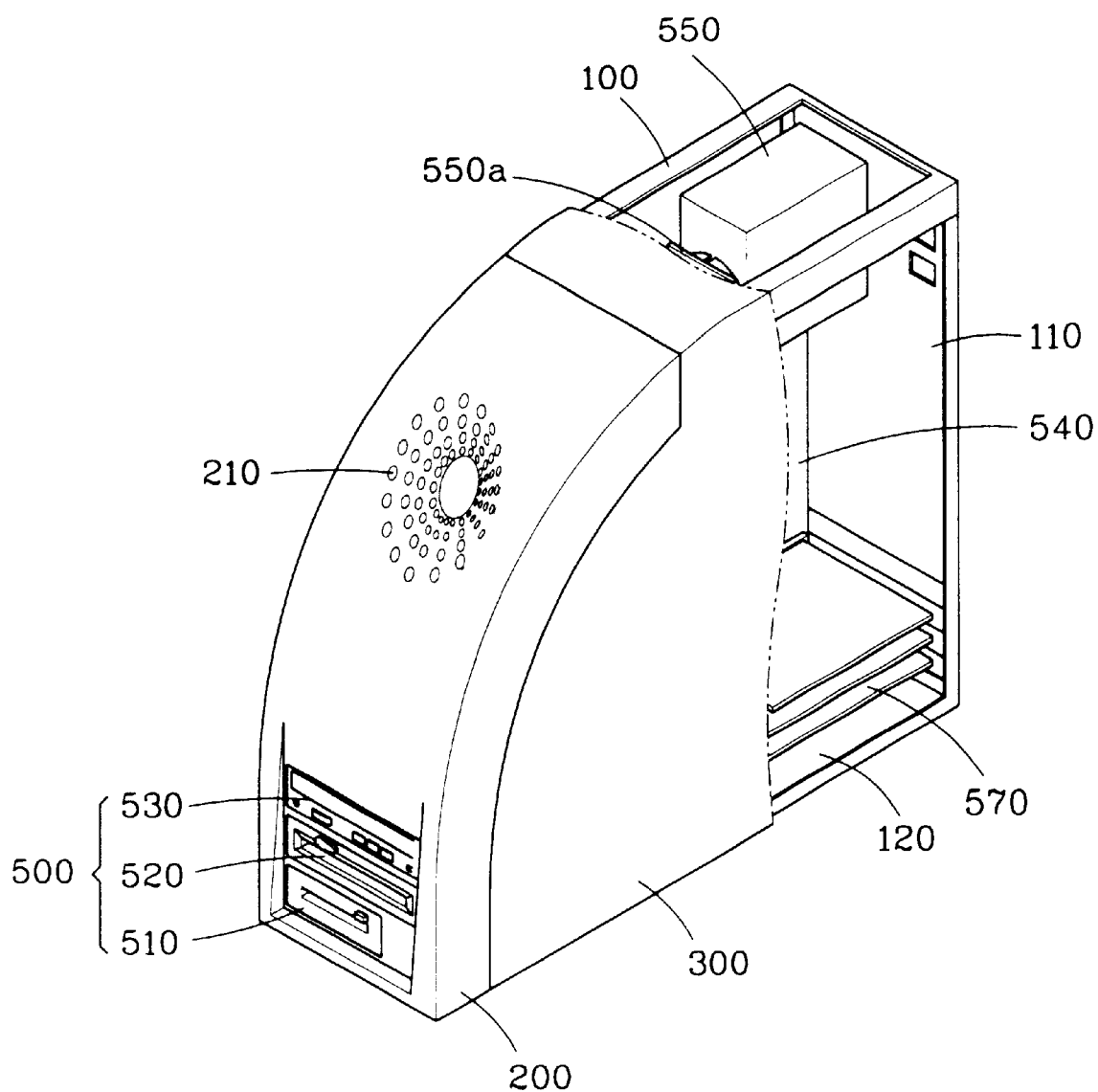
FIG. 4 is a perspective view illustrating a tower-type personal computer according to the present invention.
Figure 5:
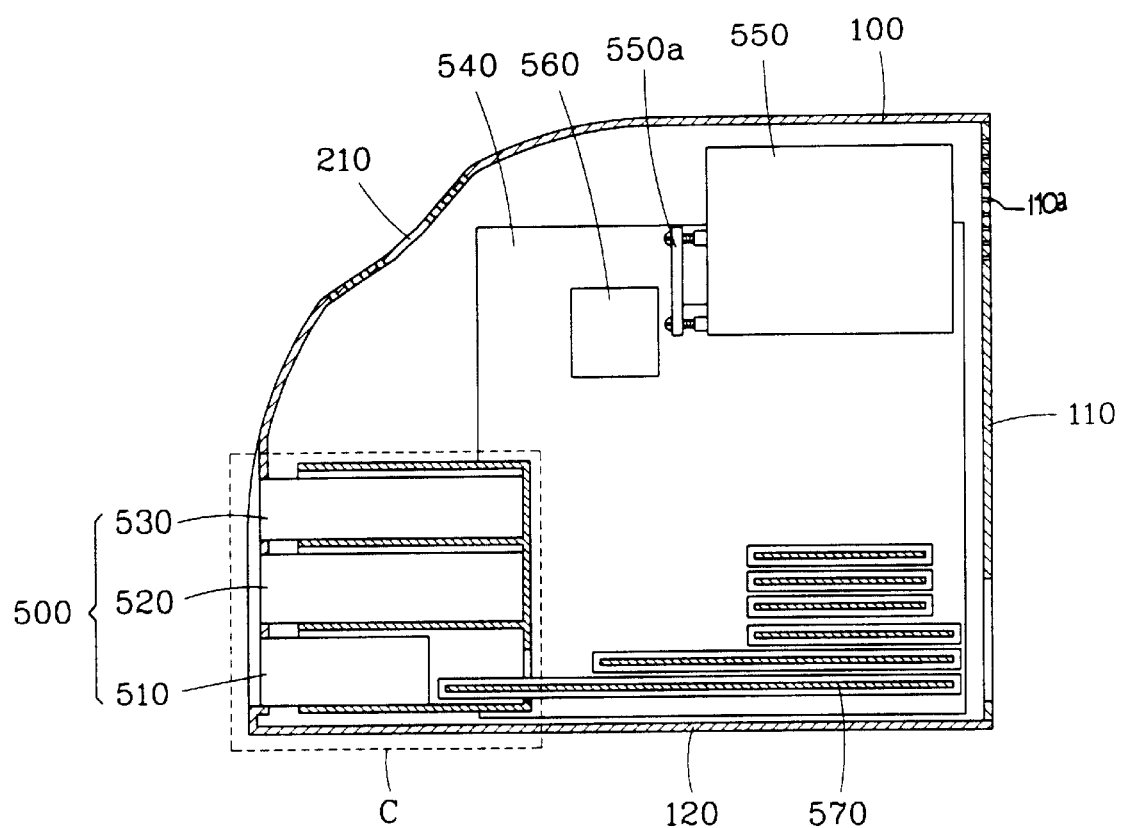
FIG. 5 is a side-sectional view illustrating a structure of the tower-type personal computer according to the present invention.

FIG. 4 is a perspective view illustrating the tower-type personal computer according to the present invention. FIG. 5 is a side-sectional view illustrating the structure of the tower-type personal computer according to the present invention.

Referring to FIGS. 4 and 5, the structure of the tower-type personal computer includes: a frame 100 having its rear portion provided with a rear panel 110, its front lower portion provided with a device drive module installing space (C) so that a disk and the like are inserted thereinto, its front upper portion formed in a round shape curved toward a rear direction, and its one side formed in order for computer components to be installed; a front panel 200 provided at the front portion of the frame 100, having its lower portion formed for device drive modules to be installed, and having its upper portion formed in the shape of the upper portion of the frame 100, a plurality of vent holes 210 being formed at the round-shaped portion; a bottom panel 120 forming a bottom portion of the frame 100; and a cover 300 forming an outline by covering the frame 100.

A system driving the computer described above is provided in the computer. Device modules 500 such as an FDD module 510, an HDD module 520 and a CD-ROM module 530 are installed at the installing space (C) of the front lower portion of the frame 100. A mother board 540 is provided at one side portion of the frame 100. Various interface circuit boards are arranged on the mother board in order to share a signal cable or a power wire.

Further, a power supply 550 supplying a power to the system is provided at the rear upper portion of the frame 100. A central processing unit 560 is installed adjacent to the power supply 550 on the mother board. That is, in profile, the CPU 560 is partly overlapped with the power supply 550. It is also possible to position the CPU 560 at the lower portion of the power supply 550. A plurality of option cards 570 providing additional functions to the system are installed at the lower portion of the mother board.

Here, the plurality of option cards 570 are alternately positioned with the device drive modules 500 so that the option cards 570 may utilize a region of the module installing space (C) according to length thereof.

In addition, a cooling fan 550a affixed to the power supply 550 is positioned toward the central processing unit 560. A first plurality of holes 110a are formed at the rear panel 110 which is adjacent to the power supply 550 and in line with a second plurality of holes, and thus an air can be easily passed.

According to the present invention, the module installing space (C) for installing the device drive modules is provided at the front lower portion in the frame 100. A space for installing the power supply 550 and the central processing unit 560 is provided at the rear upper portion of the frame 100. Also, a space for installing the plurality of option cards 570 is provided at the lower portion thereof.

Here, the installing position of the power supply 550 and the central processing unit 560 can be exchanged with the installing position of the option cards 570. That is, the power supply 550 and the CPU 560 may be positioned at the lower portion of the frame 110, and the option card 570 may be positioned at the upper portion of the frame 110. Also in this case, the cooling fan 550a of the power supply 550 is positioned toward the central processing unit 560.

In accordance with the structure of the tower-type personal computer of the present invention, a heat generated from the central processing unit 560 in operation is cooled by the cooling fan 550a of the power supply 550 that is positioned toward the central processing unit 560. The power supply 550 and CPU 560 generating a lot of heat are arranged at the upper portion of the frame 100, and an air heated by the heat rises. Thereafter, the heat is not transmitted to the module installing space (C), but externally discharged through the vent holes 210 formed at the round-shaped portion of the front panel 200.

As discussed earlier, the structure of the tower-type personal computer in accordance with the present invention is provided with the round-shaped front panel, thereby reducing an unnecessary space, minimizing the product in size, and improving an aesthetic sense of the outline design.

In addition, in accordance with the present invention, the heat generated from the system is externally discharged through the vent holes by the cooling fan, and thus cooling is rapidly carried out. As a result, a mis-operation of the system is prevented, a lifespan of the product is increased, and a competitive power in cost is improved due to reduction in production cost by decreasing additional components for cooling.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A structure of a tower-type computer comprising:
   a frame having a front lower portion provided with a disk drive module installing space so that a storage media is inserted thereinto, a front upper portion formed in a round shape curved toward a rear direction, and its one side formed in order for computer components to be installed;
   a front panel provided at the front portion of the frame, having a lower portion formed for disk drive modules to be inserted, and having an upper portion with a plurality- of vent holes and formed in a round shape curved toward a rear direction identically to the upper portion of the frame, for discharging heat generated by the computer;
   a power supply installed at an upper portion of the frame;
   a central processing unit positioned at an upper portion of the frame and adjacently to the power supply, and
   a cooling fan positioned between the power supply and the central processing unit, said cooling fan discharging heat generated from the central processing unit and the power supply by directing air flow through said plurality of vent holes in the upper portion of the front panel.

2. The structure according to claim 1, wherein at least one option card positioned in a lower portion of the frame and the disk drive modules are alternately positioned in order not to interfere with each other.

3. The structure according to claim 1, wherein the fan is positioned toward the central processing unit.

4. The structure according to claim 1, further comprising a concave depression in a region of the front panel including the vent holes in order to position the vent holes more closely adjacent to the power supply than the surrounding regions of the front panel.

5. A structure of a tower-type computer comprising:

a quarter-circle shaped frame supporting a quarter-pie-slice shaped enclosure.

a front panel forming part of said enclosure, having the same curvature as the quarter-circle frame, and having a first plurality of vent holes at an upper portion; and a rear panel forming a part of said enclosure, and having a second plurality of vent holes, said second plurality of vent holes being in horizontal alignment with said first plurality of vent holes; and a side panel having the shape of a quarter-circle, forming part of said enclosure.

6. A structure of a tower-type computer comprising:

a quarter-circle shaped frame, having a front lower portion provided with a device drive module installing space so that media such as a disk are insertable thereinto, a front upper portion with one side formed in order for computer components to be installed;

a rear panel forming a part of an enclosure, and having a plurality of vent holes in an upper portion;

a front panel forming part of an enclosure, provided at the front portion of the frame, having the curvature of a quarter-circle, and a lower portion formed for device drive modules to be installed, and an upper portion with rings of vent holes for discharging heat generated from a central processing unit and a power supply adjacently positioned in a straight line horizontal air-flow path between said rings of vent holes and said plurality of vent holes in said rear panel;

a bottom panel forming a bottom portion of said enclosure; and a cover with a quarter-circle shape, covering the frame and forming part of said enclosure.

* * * * *